N. Morris,
Cage Trap.
No. 63,651.      Patented Apr. 9, 1867.
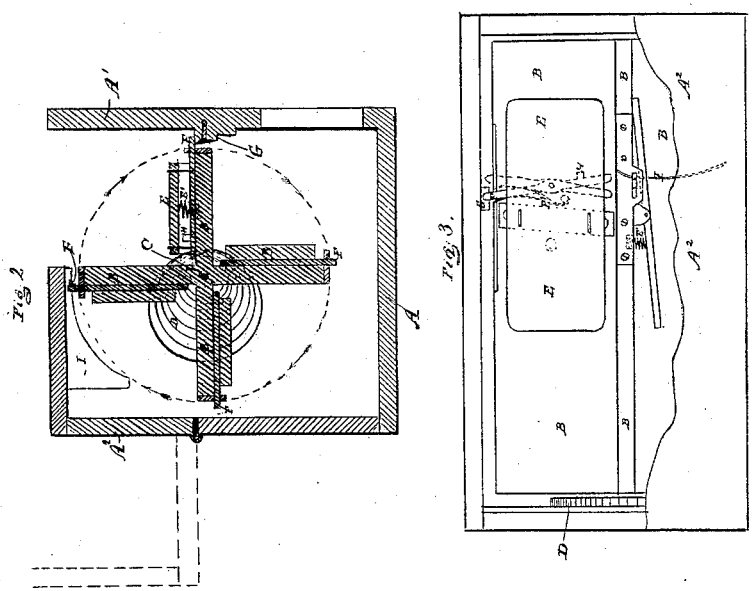
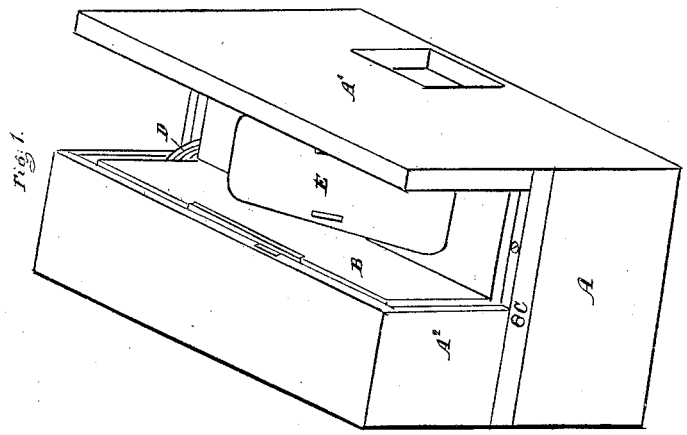

United States Patent Office.

WILLIAM MORRIS, OF ELKHART CITY, ILLINOIS.

Letters Patent No. 63,651, dated April 9, 1867.

IMPROVEMENT IN ANIMAL TRAPS.

The Schedule referred to in these Letters Patent and making part of the same.

TO ALL WHOM IT MAY CONCERN:

Be it known that I, WILLIAM MORRIS, of Elkhart City, in the county of Logan, and State of Illinois, have invented a new and useful Improvement in Traps for catching rats and other animals; and I do hereby declare that the following is a full, clear, and exact description of the same, reference being had to the annexed drawings, making a part of this specification, in which—

Figure 1 is a perspective view.

Figure 2 is transverse vertical section.

Figure 3 is a top view with part of the cover represented as broken off.

The same letters are employed in all the figures in the indication of parts which are identical.

A is a box having the front board $A^1$ extending upwards, and opposite to it, near the middle a hinged cam, $A^2$, leaving an open space between them. The bottom of this open space is formed alternately by the four wings B, attached to a revolving shaft, C. The shaft is made to revolve by the coiled spring D or any equivalent power. To the wings B I attach the oscillating platforms E, which are hinged to vibrate on their centre, a spiral spring, $E^1$, being placed under one end to raise it when any weight which may have depressed the opposite end is removed. On the end of the platform to which the spring $E^1$ is applied is hinged on the under side the horizontally oscillating latch F, the point of which extends beyond the wing B far enough to strike against and rest upon the catch G, fastened to the side $A^1$ of the box. H is a projection on the under side of the platform E, which, when the latch is drawn back, holds it in place against the pressure of the spring $F'$, which presses against the opposite side and end of the latch. When the opposite end of the platform is depressed by the weight of a rat or other animal resting upon it, the detent H will be raised so as to disengage the lever, which is instantly forced by the spring $F'$ off from the catch G, and the weight of the animal and stress of the spring D will cause the wings to turn until the one that was horizontal becomes vertical and the upper one next in succession is brought into the position previously occupied by the former one, it being in like manner retained by its latch F resting upon the catch G. The rat or other animal will fall with the wing on which it was standing into the box below the wings, whence it cannot escape. I is a guide formed by a strip of metal in the form of a triangle, having its projecting point bent, as shown, which is attached underneath the top of the hinged cover $A^2$, and placed in such position that the point of the latches F will, with the revolution of the wings, successively strike gainst its side and edge and be thrown back so that the catch H shall drop behind and hold them in position to strike against the catch G in succession. By this means the action of the trap is made automatic, and it will continue to turn, catching rat after rat and securing it in the box, until the spring D or other equivalent power ceases to act. I prefer to make the oscillating platform E of the whole length of the wings, so that all the mechanism shall be out of sight. The trap may be placed in such position that the animals may be compelled to traverse the space between the vertical wing and the side $A^1$, or a bait may be attached to the latter. The spring D may be wound up by turning off the cover $A^2$ so that the flange-plate I shall not act upon the latches F, and turning the wings and shaft C in the reverse direction. In setting the trap in the first instance, the first and second latches should be set by hand; the others will be set automatically as they pass against the flange plate I.

What I claim as my invention, and desire to secure by Letters Patent, is—

1. The combination of the revolving wings B, the coiled spring D or its equivalent, the oscillating platform E, latch F, and catch G.

2. The combination of the latch F, the detent H, and guide-plate I, substantially as set forth.

3. The combination of the oscillating platform E, the spring $E^1$, detent H, revolving wings B, latch F, and catch G, substantially as set forth.

In testimony whereof I have signed my name to this specification in the presence of two subscribing witnesses.

WILLIAM MORRIS.

Witnesses:
 D. P. HOLLOWAY,
 GEO. W. WOOD.